(12) United States Patent
Sisk et al.

(10) Patent No.: US 7,520,925 B2
(45) Date of Patent: Apr. 21, 2009

(54) FILTER AND SILENCER WITH A QUICK DISCONNECT LID

(75) Inventors: David E. Sisk, Bonne Terre, MO (US); Roger Breakfield, Potosi, MO (US)

(73) Assignee: Sure Seal, Inc., Saint Paul, MO (US)

( * ) Notice: Subject to any disclaimer, the term of this patent is extended or adjusted under 35 U.S.C. 154(b) by 103 days.

(21) Appl. No.: 11/641,287

(22) Filed: Dec. 19, 2006

(65) Prior Publication Data

US 2007/0137490 A1 Jun. 21, 2007

Related U.S. Application Data

(60) Provisional application No. 60/752,696, filed on Dec. 21, 2005.

(51) Int. Cl.
*B01D 46/00* (2006.01)
(52) U.S. Cl. .............. 96/420; 96/380; 55/320; 55/357; 55/418; 55/480; 55/493; 55/498
(58) Field of Classification Search .......... 55/467, 55/478, 480, 498, 503, 493, 504, 505, 385.3, 55/310, 311, 309; 96/380
See application file for complete search history.

(56) References Cited

U.S. PATENT DOCUMENTS

| | | | | |
|---|---|---|---|---|
| 2,897,005 A | * | 7/1959 | Wiltse | 406/95 |
| 3,201,927 A | * | 8/1965 | Wachter | 55/504 |
| 3,295,679 A | * | 1/1967 | Rosaen | 210/90 |
| 3,300,050 A | * | 1/1967 | Perry | 210/234 |
| 3,929,379 A | * | 12/1975 | Krambrock | 406/95 |
| 4,207,883 A | | 6/1980 | Shindler | |
| D261,501 S | | 10/1981 | Schenker | |
| 4,316,522 A | | 2/1982 | Hirschorn | |
| 4,632,682 A | * | 12/1986 | Erdmannsdorfer | 55/498 |
| 4,818,398 A | * | 4/1989 | Lott et al. | 210/238 |
| 4,871,455 A | * | 10/1989 | Terhune et al. | 210/232 |
| 5,067,856 A | * | 11/1991 | Sisk | 406/41 |
| 5,653,870 A | * | 8/1997 | Tsuchiya et al. | 210/232 |
| 2003/0234137 A1 | * | 12/2003 | Buckner | 181/231 |
| 2005/0178716 A1 | * | 8/2005 | Suri | 210/437 |

* cited by examiner

*Primary Examiner*—Duane S Smith
*Assistant Examiner*—Sonji Turner
(74) *Attorney, Agent, or Firm*—Paul M. Denk (57) ABSTRACT

A filter silencer with quick disconnect lid has a cylindrical hollow casing, an inlet, a filter within the casing, a spring loaded seal plate beneath the filter, a flange opposite the inlet, and a lid turning to connect to the flange. The inlet admits blower air into the casing generally beneath the spring loaded seal and the air enters the sides of the filter. The air travels upwards through the filter and exits through the lid. Wear pads beneath a locking ring engage the tapered ears upon the lid. The lid has an outlet through which filtered air discharges. The lid has ports for monitoring differential pressure and air temperature while the casing has a port for a pressure relief valve.

10 Claims, 5 Drawing Sheets

FILTER AND SILENCER WITH A QUICK DISCONNECT LID

CROSS REFERENCE TO RELATED APPLICATION

This nonprovisional patent application claims priority to the provisional patent application having Ser. No. 60/752,696, which was filed on Dec. 21, 2005.

BACKGROUND OF THE INVENTION

The filter and silencer with a quick disconnect lid relates to pneumatic conveying systems in general and more specifically to a filter silencer for blower air that can be inspected readily. The filter silencer is often installed upon a tractor for a pneumatic tank trailer. Unique aspects of the present filter and silencer are a lid rotating opposite its connecting threads, wear pads, and a biased plate that retains the filter element.

Pipe or hopper tees on railway tank cars, tank trailers, pipelines and other means for conveyance distribute product from the storage carrier to a delivery point. The product exits the storage compartments of a transport carrier, like a trailer, then flows through piping upon the trailer for delivery by hose or further piping. In dry bulk hauling, such as pellets, powders, and grains, seal integrity at the pipe connection is essential to prevent contamination of the materials later hauled in a tank car. The pellets or powders unload from gravity gate valves or hoppers located on the bottom of a tank car. Tees attached to the bottom of a hopper connect with collection pipes. A vacuum or air stream from a pneumatic conveyor system created in the pipe accelerates the unloading of dry bulk products from a hopper.

A hopper must be completely empty of a dry bulk product to prevent contamination with later loads. As an example, if a tank car carries black plastic resin beads, no trace of the black plastic resin beads can remain in the car, the hopper, and the piping to prevent contamination with a subsequent load of white resin beads. A second example shows the need for complete emptying of a product from the entire car: edible white flour. If the tank car or piping system traps the flour and mold develops, later loads of flour will acquire mold. A third example, bulk liquids contaminating bulk dry loads, can render a load useless at great cost in disposal and other losses.

Presently, the bulk transporting industry favors downloading dry product from tank trailers by pneumatic systems. A pneumatic system begins with a blower mounted to a tractor, often a truck. When turning at high revolutions per minute, the blower forces air into a discharge pipe that pressurizes the collection pipes below a trailer. The pressurized air then delivers the dry bulk product from the collection pipes to the delivery point, commonly a hose. Alas, a typical blower generates much noise and permits traces of oil, grease, and dirt to enter the discharge pipe. As mentioned above, contamination remains of high concern to dry bulk haulers, particularly in foodstuffs and ingredients. During downloading of dry bulk products, contamination must be lowered to meet food safety standards and noise levels must be lowered to conform with local noise ordinances.

The present art overcomes the limitations of the prior art. That is, in the art of the present invention, a filter silencer with a quick disconnect lid has a filter for removing air impurities and deadening blower noise and a removable lid to inspect the filter readily.

SUMMARY OF THE INVENTION

A filter silencer with quick disconnect lid has a cylindrical hollow casing, an inlet at one end of the casing and perpendicular to the casing, a filter placed within the casing, a spring loaded seal beneath the filter, a flange upon the casing opposite the inlet, and a quick releasing lid connecting to the flange. The inlet admits blower air into the casing generally beneath the spring loaded seal and the air enters the casing and then the sides of the filter. The air travels up through the center of the filter and exits through the lid. The flange has wear pads on the underside of a locking ring that engages tapered ears upon the lid. The lid has a hollow central portion through which filtered air exhausts to the discharge pipe. The lid has ports for monitoring differential pressure and air temperature. The casing has a port for a pressure relief valve.

The present invention has a baffle to redirect air as it exits a blower and to send the blower air into the filter. The filter provides dual functions of lowering blower noise transmitted through the discharge and collection pipes, and removes impurities in the blower air prior to entry into the collection pipes. When downloading dry bulk product, an operator monitors the present invention. The temperature gauge indicates the temperature of the blower air as it exits the present invention and enters the collection pipes. Air too hot or too cold requires the operator to adjust the blower. The pressure ports and relief valve allow an operator to monitor the air pressure at various points on the present invention. In normal operations, the air pressure on the inlet and the outlet of the filter remains nearly the same. However, as the filter becomes full or clogged, the inlet air pressure will exceed the outlet air pressure markedly. The differential pressure gauge indicates this to the operator who takes prompt remedial action regarding cleaning the filter.

When having to clean or inspect a filter, the lid allows an operator ready access to the filter. An operator inserts at least one handle into the lid and then twists the lid counterclockwise one quarter turn. The counterclockwise turning removes the ears from beneath a locking ring and allows the lid to be pulled upwards and off the present invention. Following maintenance of the filter, an operator places the lid upon the present invention, at the flange, and presses down upon the filter. The pressing down engages the spring beneath the filter. The operator guides the ears into the locking ring then turns the lid clockwise to place the ears under the locking ring. In an alternate embodiment, an operator inserts a pin to positively lock the lid in the closed position upon the flange.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved filter silencer with a quick disconnect lid.

Another object is to provide such a filter silencer that is readily inspected by removing the lid with a minimum of tools.

A further object is to provide such a filter silencer that allows monitoring of the temperature and pressure of air traveling through the invention.

A still further object is to provide such a filter silencer that limits wear upon the flange as the lid is removed repeatedly for inspection and servicing of the filter within the casing.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention

BRIEF DESCRIPTION OF THE DRAWINGS

The same reference numerals refer to the same parts throughout the various figures.

DESCRIPTION OF THE PREFERRED EMBODIMENT

The present invention overcomes the prior art limitations by providing a filter silencer having a readily removed lid and an upwardly biased filter element.

Figure 1:
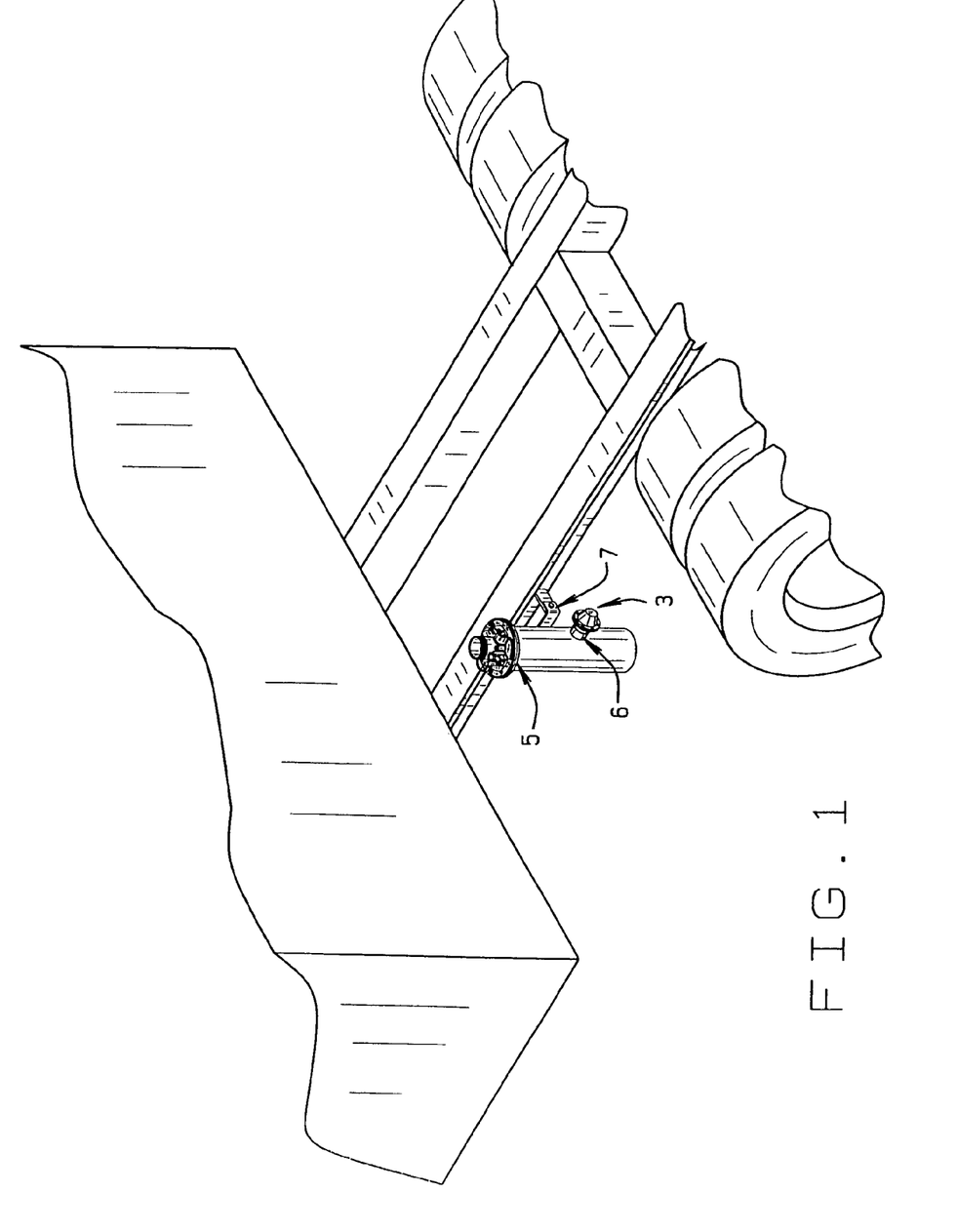
FIG. 1 shows an isometric view of the filter silencer installed upon the frame of a truck or tractor.

Bulk product moves between locations by various means. One of such is truck transport by use of a tank trailer. The bulk product is stored in a trailer connected to a tractor that pulls the trailer to a desired location. The trailer has a pneumatic system for unloading bulk product contained therein. The pneumatic system has its air power from a blower turned by an engine generally upon the truck but sometimes upon the trailer. When mounted upon the tractor, the blower produces pressurized air that may have impurities contained therein. Impurities in the air require removal lest the bulk product become contaminated. The pressurized air from the blower is filtered by the present invention here shown mounted upon a truck frame in FIG. 1. The present invention has a casing that has perpendicular clips 7 that connect to the truck frame. Below the clips, the present invention has an inlet 3, later shown in FIG. 2, that receives the blower air into the casing. Above the inlet, the casing has an opening 6 for a pressure relief valve here shown installed. Upon the top of the casing and above the truck frame, a flange 5 receives the lid that has an outlet that provides filtered air to the pneumatic conveying system and then unloads a trailer or other storage container for bulk product.

Figure 2:
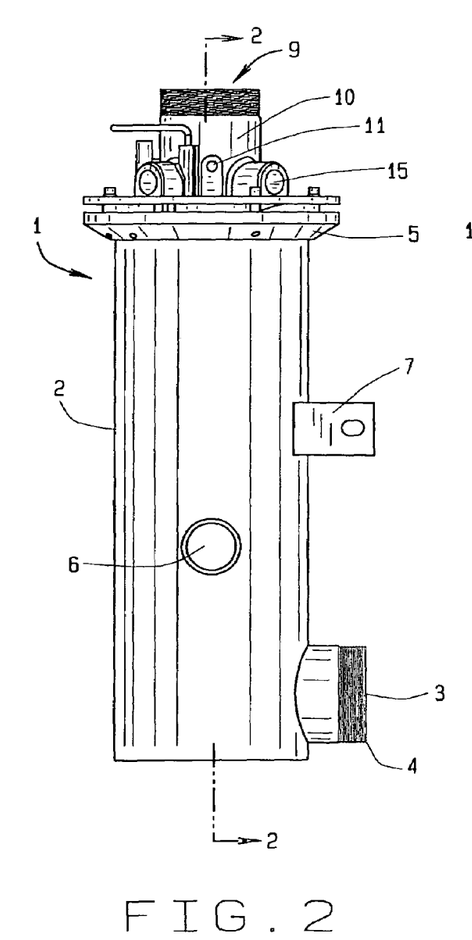
FIG. 2 shows a side view of the filter silencer in accordance with the principles of the present invention.

Turning to FIG. 2, the preferred embodiment of the filter silencer 1 has a generally hollow cylindrical casing 2 with a length at least twice its diameter. The casing has two opposed ends with the lower end being closed and the upper end being open. Adjacent to the lower end, an inlet 3 admits blower air into the casing. The inlet extends perpendicular to the casing and has threads 4, a groove, and like connecting means opposite the casing. The inlet connects to the blower of a pneumatic conveyor system powered by a road tractor or truck. The upper end has a flange 5 extending outwards from the circumference of the casing. Upon the casing generally above the inlet, the casing has an opening 6 for a pressure relief valve. The opening extends radially through the casing. Also above the inlet and generally parallel to the inlet, the casing 7 has at least one clip extending outwards from the casing. The clip permits installation of the casing to the frame of a road tractor.

Viewing the upper end of the casing, the flange serves as a securement for bolts 5a extending parallel to the length of the casing. Each bolt has a spacer located upon the flange. Upon the spacers, a locking ring 8 rests and is secured by the bolts. The locking ring cooperates with the lid to partially close the upper end of the casing to the flow of filtered air out of the present invention.

The lid 9 releasably secures to the locking ring and has a centered hollow cylinder or outlet 10 to evacuate air from within the casing and onward into the discharge pipe (not shown). The cylinder is generally of smaller diameter than the casing and the flange and has a wall 10a. The cylinder is approximately the diameter of the inlet. The cylinder has threads 10b, a groove, or other similar means opposite the locking ring for connection to further piping or the exhaust system to remove air. The cylinder has at least two ports 11 extending radially through the wall. The ports are generally located towards the flange. The cylinder has a threaded hole 12 located perpendicular to the ports and generally parallel to the inlet into which is admitted a temperature gauge 13. The temperature gauge has a probe that extends through the wall of the cylinder and into the air flow. The temperature gauge then provides a reading of the temperature of air exiting the present invention. Locating above the temperature gauge, the present invention has a thin wire like handle 14. The handle is generally parallel to the flange and has two ends secured to the wall of the cylinder. The wall is supported by four equally spaced radial taps 15, all located upon one end of the wall. The taps extend outwards from the wall onto the lid.

Figure 3:
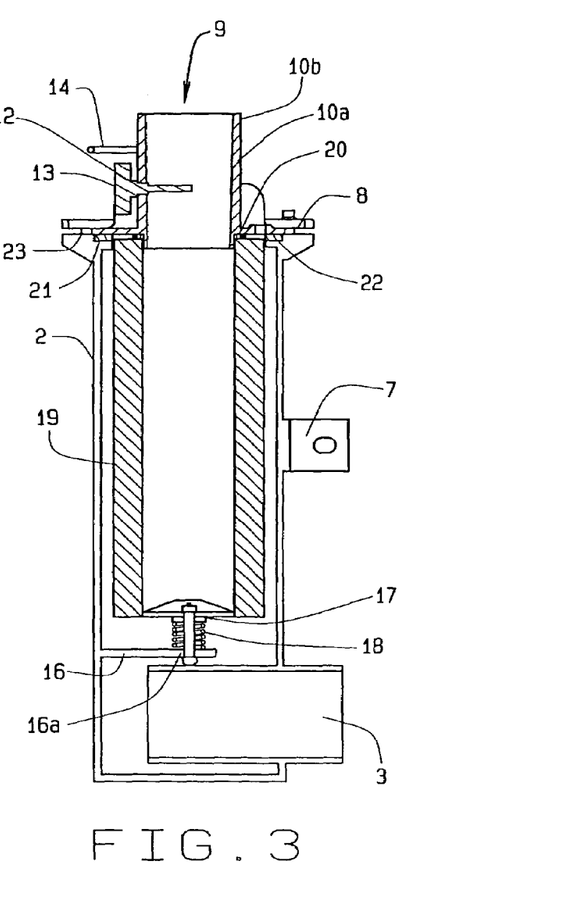
FIG. 3 shows a section view through the filter silencer.

The workings of the present invention are further shown in FIG. 3 as a sectional view. The inlet is a tube extending through and into the casing. The inlet extends beyond the center of the casing. Above the inlet, the casing has a baffle 16 extending from the casing to slightly beyond the center of the casing. The baffle has a generally narrow width and a hole 16a located generally at the centerline of the casing. A spring loaded seal plate 17 then connects to the baffle with a bolt. A spring 18 is coaxial with the bolt and is located between the baffle and the seal plate. The seal plate has a diameter less than the casing, approximately that of the filter element.

Upon the plate rests the filter element 19. The filter element has a hollow cylindrical form where the inner diameter of the filter element matches the diameter of the cylinder of the lid. The filter element allows blower air to enter along its length and removes impurities from the blower air passing through the filter element, then admits the air into the lid through the cylinder. The filter element has vertically extending pleats of filter medium. The pleats provide at least 23 square feet of surface area while folded to a width of approximately one inch. The filter medium removes 99% of particles of one micron and larger diameter and handles 1000 C.F.M. of air volume on a back pressure of 0.05 psi. The filter medium can operate with air of less than 400° F. and can be rinsed from time to time with a hose.

The lower end of the filter rests upon the seal plate 17 and the upper end of the filter abuts the lid. The upper end of the filter is open and fits snugly upon the outlet. Upon the inner diameter of the upper end, the filter has a filter gasket 20 that seals the junction between the outlet of the lid and the upper end of the filter. Outwards from the upper end, the flange has a lid gasket 21. The lid gasket seats in a groove 22 upon the flange inside of the bolts. The lid gasket is a ring with an inner diameter slightly larger than the outer diameter of the filter. The outer diameter of the lid gasket is less than the spacing between opposite bolts. Slightly outwards from the lid gasket, the flange has wear plates 23. The wear plates receive the ears of the lid later shown in FIG. 4. Above the wear plates, a locking ring is spaced apart and parallel to the flange as it rests upon the spacers secured by bolts to the flange. The lid has the centered outlet here showing the threaded hole with the temperature gauge inserted into the air flow of the outlet.

Figure 4:
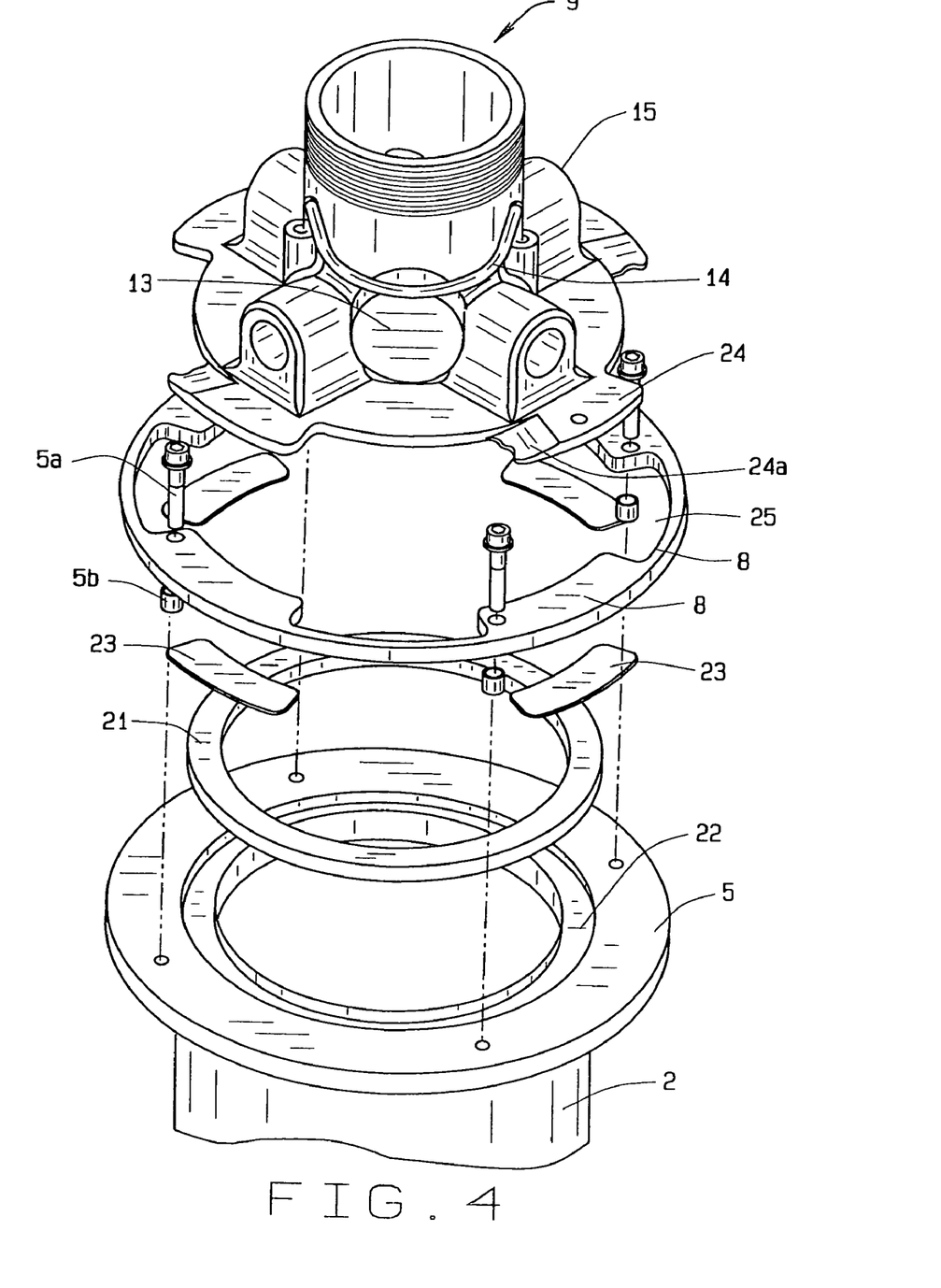
FIG. 4 is an exploded view of the lid of the filter silencer.

As previously described, the lid connects to a locking ring upon the flange. The parts that perform the connection are shown in FIG. 4. The lid has an upright centered outlet with an annular round plate upon one end of the lid. The annular plate denotes the bottom of the lid. The annular plate has four equally spaced ears 24 extending therefrom. Each ear extends outward from the plate and partially along the circumference of the plate, generally slightly wider than a tap. Each ear has a tapered end 24a that secures the lid when turned clockwise as the ears pass through the slots and then under the locking ring.

The ears 24 insert into cooperating slots 25 in a locking ring 8. The locking ring has four equally spaced slots that have the same width and depth as an ear. The locking ring has an outer diameter greater than that of an ear. The locking ring extends along each slot forming a narrow band denoting the outside of each slot. Between slots, the locking ring has a width comparable to the depth of an ear. The locking ring secures to the flange with four bolts threadily connected perpendicular to the flange. Each bolt has a spacer 5b to raise the locking ring above the flange thus permitting insertion of the ears and rotation of the lid. Upon the underside of the locking ring, four equally spaced pads join to the wide parts of the locking ring. The pads are located upon the locking ring under which the ears of the lid turn and then come to rest. The pads are nylon with a smooth surface upon which the ears travel. An adhesive backing attaches each pad to the underside of the locking ring. The lid gasket rests upon a groove in the flange and seals the lid to the flange. The lid gasket is an FDA approved white silicone material generally ring shaped with an outside diameter similar to the diameter of the casing.

Figure 5:
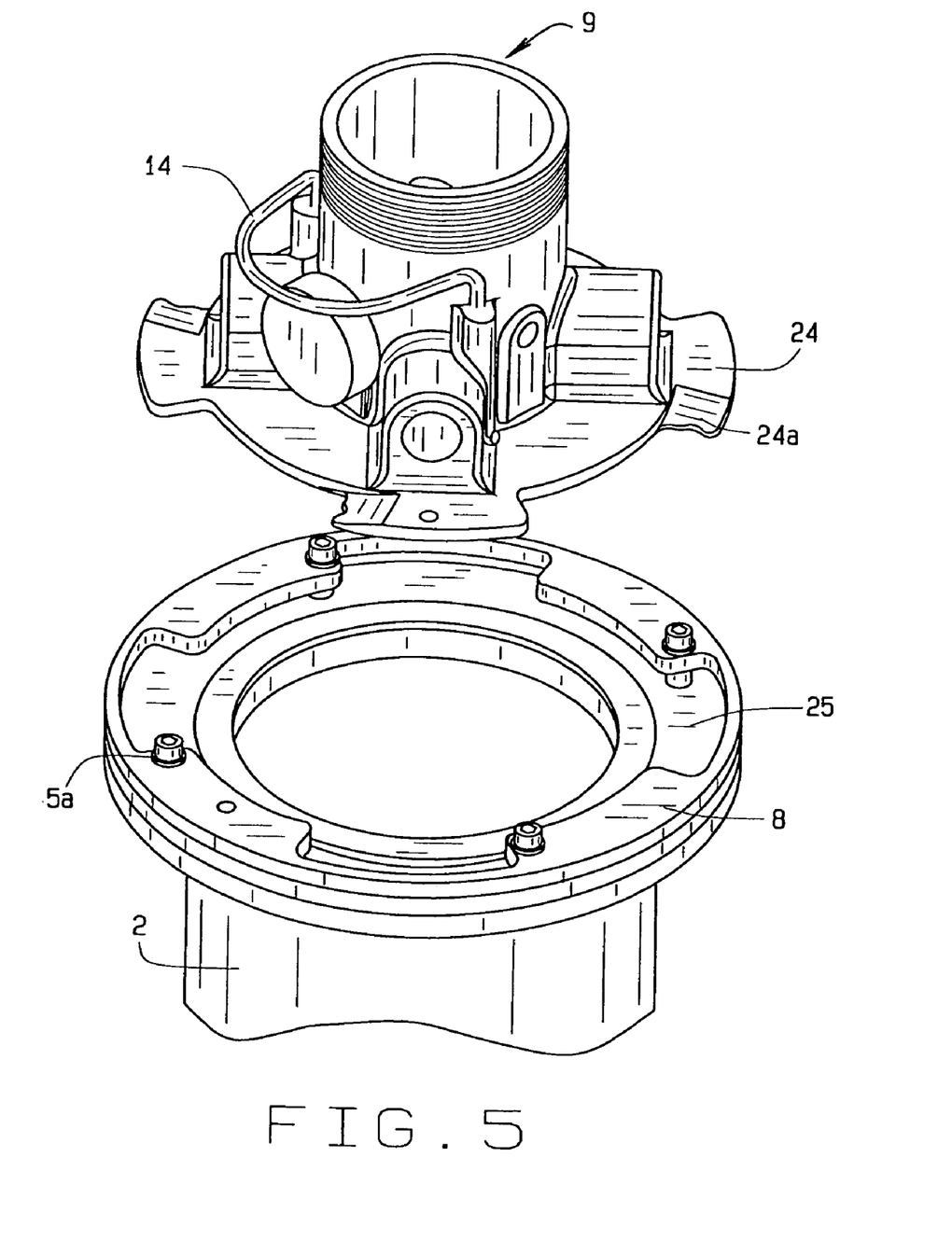
FIG. 5 shows a detailed view of the lid approaching the casing.
Figure 6:
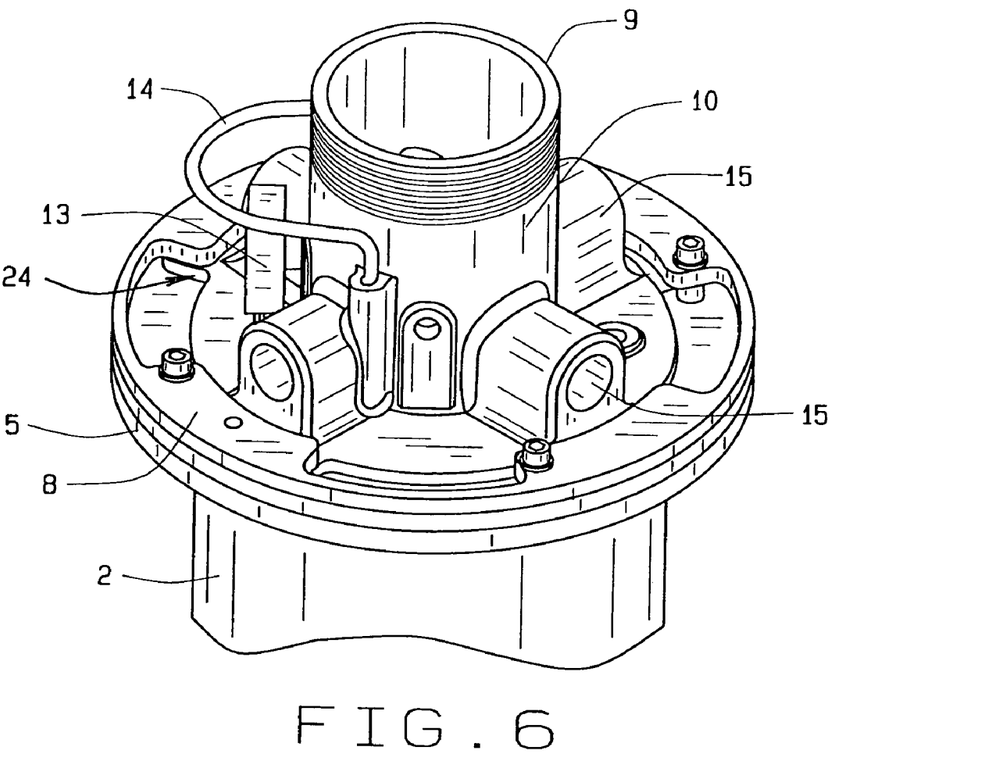
FIG. 6 shows an isometric view of the lid upon the casing.

When the present invention is assembled from the parts of FIG. 4, the lid approaches the flange to enclose the filter element as shown in FIG. 5. The ears of the lid are aligned above the slots in the locking ring and the outlet generally above the casing. As the ears and slots having cooperating shapes, the lid fits into the locking ring as shown in FIG. 6. Grasping the handle, a person turns the lid to secure it upon the flange of the casing. FIG. 6 shows the lid after the lid is rotated clockwise which brings the ears beneath the locking ring and above the flange. The ears travel upon the wear pads and come to rest beneath the wide parts of the locking ring. When secured upon the flange, the lid provides temperature and pressure measuring of air exiting the outlet.

Figure 7:
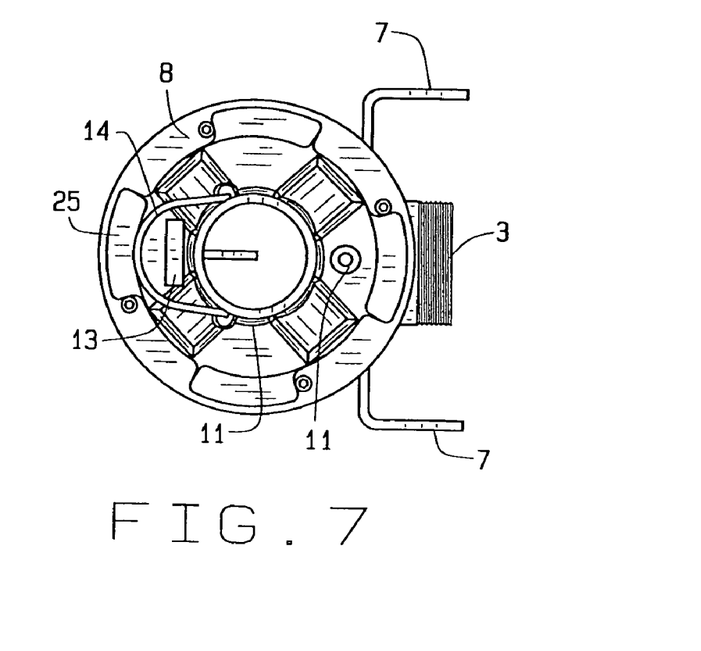
FIG. 7 shows a top view of the lid secured upon the flange.

Viewing the lid from above, FIG. 7 shows the lid secured upon the locking ring. The handle generally attains a position opposite the inlet on the lower end of the casing below. The inlet is flanked by two clips that extend mutually parallel and are spaced apart. To remove the lid, the handle is turned counterclockwise thus moving the ears to the slots. The ears are then withdrawn from the slots, and the lid from the locking ring and thus from the flange.

From the aforementioned description, a filter and silencer with a quick disconnect lid has been described. The filter and silencer is uniquely capable of readily removing a lid to allow inspection or removal of a filter beneath the lid. The filter silencer and its various components may be manufactured from many materials including but not limited to acrylonitrile, polymers, silicone, high density polyethylene HDPE, polypropylene PP, polyethylene terephalate ethylene PETE, polyvinyl chloride PVC, nylon, ferrous and non-ferrous metals, their alloys and composites.

The phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A device for filtering and silencing blower air from a pneumatic conveying blower, said device comprising:
   a casing, generally a narrow walled cylinder, having a closed lower end and an opposite open upper end, an inner diameter and an outer diameter, an inlet extending outward from said casing proximate said lower end adapted to receive blower air, and a flange joining said upper end;
   said flange facing generally perpendicular to the longitudinal axis of said casing and having an annular shape with an inner diameter proximate to the inner diameter of said casing;
   a locking ring, mutually parallel and spaced apart from said flange, having an upper surface, an opposite lower surface, and at least three spaced slots therein;
   a lid, having a generally centered cylindrically shaped outlet with a diameter approximately that of said inlet adapted to discharge the blower air from said device, at least three ears being coplanar and perpendicular to said outlet upon one end, said ears having a similar shape as said slots, at least three taps, each locating upon an ear and joining to said outlet; and,
   a filter element, having a generally narrow walled cylindrical shape, locating within said casing between said inlet and said lid.

2. The filtering and silencing device of claim 1 further comprising:
   said flange having a concentric groove with an inner diameter that of said filter element, and a lid gasket locating within said groove; and,
   said locking ring having at least three wear pads locating upon the lower surface upon each of which one of said ears abuts.

3. The filtering and silencing device of claim 1 further comprising:
   said casing having a baffle extending into said casing generally above said inlet; and,
   a plate having a diameter at least that of the inner diameter of said filter element and a biased connection to said baffle, said plate biasing against said filter element to seal the lower end of said element.

4. The filtering and silencing device of claim 3 further comprising:

said filter element having a plurality of pleats extending longitudinally, said plurality of pleats removing particulates from the blower air at least one micron in diameter.

5. The filtering and silencing device of claim 1 further comprising:
said lid having at least one port extending through the wall of said outlet and a temperature gauge threaded into said at least one port; and,
said casing having an aperture through the wall of said casing generally above said inlet and a pressure relief valve threaded into said aperture.

6. The filtering and silencing device of claim 2 further comprising:
said lid having a handle, generally above said ears and parallel to said ears for turning and securing said lid upon said flange as said ears enter said slots and pass under said locking ring; and,
said casing having at least one clip extending tangential to said casing and generally above said inlet.

7. The filtering and silencing device of claim 2 further comprising:
said ears having a tapered leading edge easing each ear below said locking ring as said lid is turned for closing upon said lid gasket.

8. A device for filtering and silencing blower air from a pneumatic conveying blower used in a tank trailer for aiding in the movement of bulk product, said device comprising:
a casing, said casing having an upper and opposite lower end, said casing having a hollow interior cavity, the lower end of said casing being enclosed, the opposite upper end of said casing being open, an inlet extending into the cavity of said casing, a lid provided for connecting onto the opened upper end of said casing, said lid capable of being engaged to said casing, and being removable therefrom, said lid providing an outlet for the blower air passing through the device, a filter element located within the casing cavity and extending approximately its length to provide for filtration of any blower air passing therethrough, the inlet extending into the casing at a location below the filter element located therein, a biasing device pressured against the end of the filter opposite from the casing outlet, and provided concentrically within the casing thereby requiring passage of all of the blower air to circulate through all of the filter element and into its interior during operation of the pneumatic conveying blower for filtering of blower air before its emission out of the open outlet end of the casing.

9. A device for filtering and silencing blower air from a pneumatic conveying blower as defined in claim 8 and including said biasing device including a plate, said plate being pressured by a spring against the filter element, said plate positioned against the end of the filter element opposite the casing outlet, and said biased plate pressured against the end of the filter to provide a seal for the end of the filter element against which the plate biases, and to seal the opposite end of the filter element against the casing, whereby all the blower air from the pneumatic conveying blower enters into the cylinder and through its contained filter element to provide for filtering of the blower air before its emission out the open end of the casing.

10. The device for filtering and silencing blower air from a pneumatic conveying blower as defined in claim 8, including a flange provided at the open end of said casing, said lid provided for connecting onto the open end of the casing and upon its flange, said lid capable of being locked to said flange.

* * * * *

UNITED STATES PATENT AND TRADEMARK OFFICE
CERTIFICATE OF CORRECTION

| | |
|---|---|
| PATENT NO. | : 7,520,925 B2 |
| APPLICATION NO. | : 11/641287 |
| DATED | : April 21, 2009 |
| INVENTOR(S) | : David E. Sisk and Roger Breakfield |

Page 1 of 1

It is certified that error appears in the above-identified patent and that said Letters Patent is hereby corrected as shown below:

Title page, item [73] Assignee address should read --Mineral Point, MO.--

Signed and Sealed this

Thirtieth Day of June, 2009

JOHN DOLL
*Acting Director of the United States Patent and Trademark Office*